United States Patent [19]

Hobson, Jr. et al.

[11] 3,806,764

[45] Apr. 23, 1974

[54] GROUND FAULT RESPONSIVE PROTECTION SYSTEM

[75] Inventors: Charles F. Hobson, Jr., Southington; Henry G. Willard, Wethersfield, both of Conn.

[73] Assignee: General Electric Company, New York, N.Y.

[22] Filed: Jan. 2, 1973

[21] Appl. No.: 320,538

[52] U.S. Cl. ........... 317/18 D, 317/27 R, 317/28 R, 317/36 TD, 317/38
[51] Int. Cl. ............................................. H02h 3/16
[58] Field of Search .... 317/18 D, 27 R, 28 R, 29 R, 317/36 TD, 38

[56] References Cited
UNITED STATES PATENTS

| | | | |
|---|---|---|---|
| 3,319,127 | 5/1967 | Zocholl | 317/36 TD |
| 3,619,723 | 11/1971 | Walden | 317/18 R |
| 3,539,866 | 11/1970 | Stevenson | 317/18 D |
| 3,697,810 | 10/1972 | Wilson | 317/18 D |
| 3,525,018 | 8/1970 | Murphy | 317/18 D |

*Primary Examiner*—J. D. Miller
*Assistant Examiner*—Patrick Salce
*Attorney, Agent, or Firm*—Prutzman, Hayes, Kalb & Chilton

[57] ABSTRACT

A multi-zone ground fault responsive protection system having three interlocked ground fault responsive subsystems each having a ground fault sensor, a circuit interrupter and an interrupter trip relay operable by the sensor for tripping the interrupter when the ground fault current reaches a predetermined adjustable actuator level. The subsystem relays are interlocked so that the downstream and intermediate subsystem relays are operable while activated to set the respective adjacent upstream subsystem in a time delay operating mode and also so that the downstream subsystem is operable while activated to disable the upstream system.

11 Claims, 1 Drawing Figure

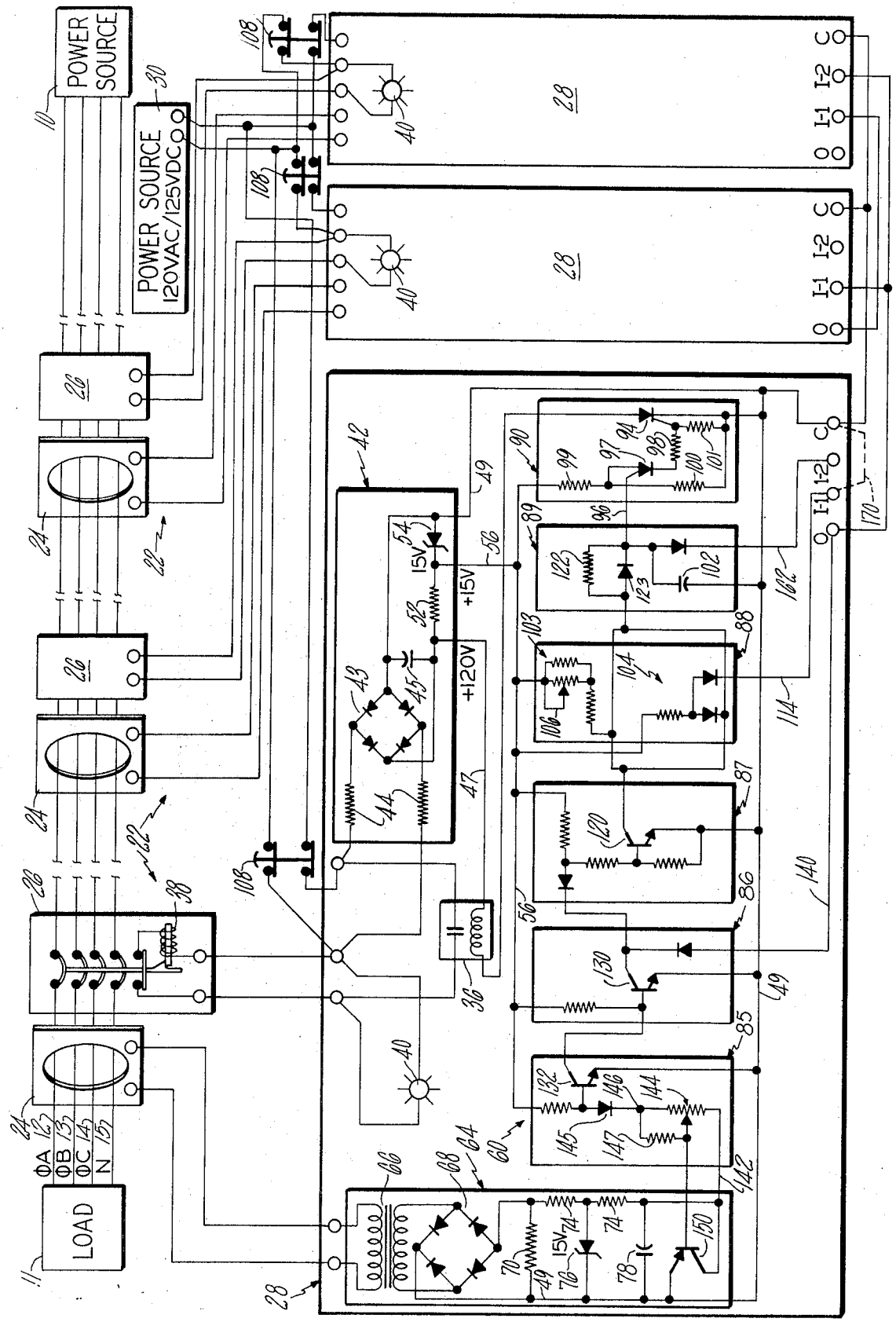

GROUND FAULT RESPONSIVE PROTECTION SYSTEM

BRIEF SUMMARY OF THE INVENTION

The present invention relates to ground fault responsive protection systems for electric power distribution systems and useful for either single zone or multizone ground fault current protection.

It is one aim of the present invention to provide a new and improved overcurrent or trip relay for a ground fault responsive protection system operable by a suitable ground fault sensor and to trip an associated circuit interrupter when the ground fault current reaches a predetermined trip level.

It is another aim of the present invention to provide a new and improved trip relay useful in multi-zone ground fault protection systems and which may be readily connected to the other trip relays of the multi-zone protection system for providing delayed action of upstream relays when the ground fault current at a downstream trip relay reaches the trip level.

It is a further aim of the present invention to provide in a multi-zone ground fault protection system a new and improved interlocking system for interlocking the individual trip relays of the multi-zone system for controlling the upstream relays with the downstream relays.

It is another aim of the present invention to provide a new and improved trip relay for a ground fault responsive protection system which has an economical and reliable control circuit.

It is a further aim of the present invention to provide a new and improved trip relay of the type described having instantaneous and time delay operating modes for respectively instantaneous and delayed tripping action of the associated interrupter when the ground fault current reaches a predetermined level. In accordance with the present invention, the ground fault relay in its delay operating mode is operable for tripping the associated interrupter upon the occurrence of a plurality of brief ground fault currents above the trip level which alone would not be of sufficient duration to trip the interrupter.

It is another aim of the present invention to provide a new and improved ground fault trip relay circuit for tripping an associated circuit interrupter when the ground fault current reaches a predetermined level and which maintains the interrupter in its interrupted condition until the ground fault trip relay has been reset.

It is another aim of the present invention to provide a new and improved ground fault trip relay having instantaneous and delay operating modes employing separate control circuits and wherein the trip relay is set in the delay mode of operation by deactivating the instantaneous control circuit.

Other objects will be in part obvious and in part pointed out more in detail hereinafter.

A better understanding of the invention will be obtained from the following detailed description and the accompanying drawing of an illustrative embodiment of the invention.

BRIEF DESCRIPTION OF THE DRAWING

The drawing is a schematic representation of an electric power distribution system incorporating an embodiment of a ground fault responsive protection system of the present invention.

DESCRIPTION OF THE PREFERRED EMBODIMENT

Referring now to the drawing in detail wherein like numerals are used to designate like parts, an electric power distribution system is shown comprising a three phase power source 10 electrically connected for supplying electrical power to load 11 via a power line consisting of phase conductors 12, 13, 14 and a neutral conductor 15. A multi-zone ground fault responsive protection system is shown provided for protecting the power distribution system against excessive ground fault current levels and to interrupt the power line when any such ground fault occurs. The multi-zone ground fault responsive protection system is shown comprising three ground fault responsive subsystems 22 providing for three zone control, for example, for main, feeder and branch power line control, it being understood that additional ground fault responsive subsystems 22 for the additional feeder and branch power lines would normally also be provided and interlocked with the other subsystems as hereinafter described. Each subsystem 22 comprises a suitable ground fault sensor 24, a circuit breaker or other suitable interrupter 26 and an overcurrent or trip relay 28 having terminals for electrically connecting the trip relay 28 to the sensor 24, the circuit breaker 26 and to a suitable ground fault system power source 30. In the shown embodiment, the power source 30 may provide for supplying either 120V AC or 125V DC power and if desired the electrical power may be supplied from the main power line upstream of the ground fault protection system.

The trip relay 28 comprises a relay 36 which, when energized, connects the power source 30 to a trip coil 38 of the respective circuit breaker 26 to trip the breaker and thereby open the electrical circuit. The circuit breaker 26 is preferably of the type which remains open until subsequently manually closed and cannot be manually closed while the relay 36 is energized. An indicator lamp 40 is shown connected to the relay terminals in parallel with the trip coil 38 to indicate that the relay 36 is latched and therefore that the circuit breaker 26 has been tripped.

An electrical power regulator circuit 42 comprising a diode rectifier bridge 43, resistors 44 and capacitor 45 provides for supplying 120V DC power to the leads 47, 49 for operating the relay 36. A resistor 52 and a Zener diode 54 having a 15V breakdown voltage are provided for supplying 15V control power via the leads 56, 49 to a solid state logic or control circuit 60 of the trip relay 28. The lead 49 serves as the electronic ground and establishes the base voltage of the trip relay 28.

A sensor signal regulator circuit 64 comprises a suitable current transformer 66 having its primary connected to the trip relay terminals for connection to the sensor 24 and its secondary connected via a diode rectifier bridge 68 to a burden resistor 70 to generate a DC ground fault signal having a voltage level which increases substantially proportionally with the ground fault current detected by the sensor 24. The bridge 68 is connected to the ground 49 such that the rectified ground fault signal is a negative voltage relative to the ground or base voltage of the lead 49. Resistors 74, a Zener diode 76 having a 15V breakdown voltage and a capacitor 78 are connected between the bridge outputs to limit the ground fault signal voltage and to reduce signal ripple.

The electronic control circuit 60 comprises a ground fault signal level detector 85 which is operable when the ground fault signal reaches a predetermined negative voltage level to operate, via control stage 86–89 of the control circuit 60, a self-latching switch 90 which completes the circuit to the relay 36 to trip the circuit breaker 26. The self-latching switch 90 comprises an SCR 94 having a gate operable by a control lead 96 via a PUT 97 and a resistor 98. The gate voltage of the PUT 97 is set by the resistors 99, 100, for example at 8.5V, so that by applying approximately 9V to the PUT via the control lead 96 the PUT 97 is made conductive and SCR 94 is thereupon made conductive to operate the relay 36. A resistor 101 is provided for preventing a transient signal in the leads from the power source 30 from switching the SCR 94 to its conductive state. When the PUT 97 becomes conductive a charged capacitor 102 (hereinafter described more fully) is discharged through the PUT 97 and resistor 98 to provide for maintaining the SCR gate current sufficiently long for the SCR line current to reach a level for maintaining the SCR conductive. Thus, once made conductive, it is assured that the SCR 97 will remain conductive to maintain the relay 36 energized and to thereby prevent manually resetting the respective breaker 26 until the trip relay 28 is reset with a suitable reset switch 108.

The control stage 89 forms a charge accumulator which is adapted to be charged by both a relatively slow charge section 103 and a relatively fast substantially instantaneous charge section 104 which are connected in parallel between the control stages 87, 89. The charge accumulator stage 89 comprises the capacitor 102 which is adapted to be via the diode 123 substantially instantaneously by the instantaneous charge section 104 and to be charged relatively slowly, also via the diode 123, by the slow charge section 103 at a rate which is adjustable by manual adjustment of a linear potentiometer 106. The capacitor 102 is thereby adapted to be charged to approximately a 9V level whereupon it makes the PUT 97 conductive to switch the SCR 94 as previously explained. The instantaneous charge section 104 may be inactivated, via an input control lead 114 as hereinafter described, in which event the slow charge section 103 is operable alone to charge the capacitor 102 to the 9V trip level at a rate which is dependent upon the setting of the potentiometer 106 and the resistor values used in the slow charge section 103. For example, the slow charge section could provide for charging the capacitor to the 9V trip level in the range of 0.03 to 1.0 seconds depending upon the potentiometer setting.

The control stage 87 comprises a transistor switch 120 which normally is held in its conductive state to ground and thereby disable the charge sections 103, 104 from charging the capacitor 102. Also, as the diode 123 permits conduction in one direction for charging the capacitor 102, the capacitor 102 is adapted to be relatively slowly discharged via the resistor 122 and the transistor switch 120 when the transistor is switched to its conductive state such that when the transistor switch 120 fluctuates between conductive and non-conductive states (due for example to a series of brief ground fault current discharges) the resistor 122 will prevent complete discharge of the capacitor 102 when the transistor switch 120 is momentarily switched to the conductive state. The resistor 122 provides for example that two-thirds of the charge of the capacitor 102 is discharged via the resistor 122 and transistor switch 120 in a seven second interval. Thus, with the trip relay 28 in either its time delay mode of operation or its instantaneous mode of operation, the memory capability of the accumulator stage 89 permits the accumulator capacitor 102 to be charged to the 9V trip level to operate the PUT 97 by a series of brief ground fault current discharges which alone have insufficient duration to charge the capacitor to the 99V trip level.

The control stage 86 functions as a zone selector and comprises a transistor 130 which is normally held in a non-conductive state by a normally conductive transistor switch 132 of the signal level detector stage 85. When the transistor 132 is switched to its non-conductive state, the transistor 130 of the zone selector stage 86 is automatically switched to its conductive state to connect the zone selector output lead 140 to the base voltage lead 49 and at the same time operate the control stage 87 to switch the transistor 120 to its non-conductive state. A ground signal is therefore generated in the control or output lead 140 when the ground fault current has reached or exceeded the detection level established by the signal level detector 85. As hereinafter explained, the ground signal in the output lead 140 is useful in automatically switching the upstream ground fault subsystems 22.

The signal level detector 85 is controlled by the negative voltage level in the output lead 142 from the sensor signal regulator circuit 64. When the voltage level in the lead 142 reaches a predetermined negative voltage depending on the setting of a manually settable substantially linear potentiometer 144, the normally conductive transistor 132 is switched to the non-conductive state to switch the control stages 86 and 87 as previously described. The potentiometer 144 is connected via a diode 145 to the base of the NPN transistor 132 and the emitter of the transistor 132 is connected directly to the base voltage lead 49 such that the input 146 of the potentiometer 144 is substantially at the base potential of the lead 49 when the transistor 132 is switched to its non-conductive state. That is, the approximately 0.5V potential drop across the diode 145 is substantially equal to the approximately 0.5V potential difference between the transistor base and emitter where the transistor 132 is switched to its non-conductive state. Also this relationship is substantially maintained throughout the normal temperature operating range of the diode 145 and transistor 132 such that the diode 145 serves as a temperature compensating device for maintaining this relationship. As a result, the manual setting of the potentiometer 144 has a substantially linear relationship with the detection level of the ground fault signal voltage at the output lead 142 such that a suitable linear scale can be used with the potentiometer 144 for indicating the ground fault current setting of the potentiometer 144 where detection occurs. In this regard the resistance of a calibration resistor 147 is quite small in comparison with the resistance of the linear resistor of the potentiometer 144 and therefore the calibration resistor 147 does not substantially adversely effect the foregoing linear relationship.

Also, a control transistor switch 150 having a suitable impedance is so connected in parallel with the capacitor 78 and with its gate connected to the potentiometer 144 that the voltage of the capacitor 78 is kept from exceeding a level which is always slightly above the detection level of the level detector 85 (where the transistor 132 is switched to the non-conductive state) and so that the transistor 132 is thereby adapted to be rapidly switched to its normal conductive state when the ground fault signal level falls below the detection level.

Each trip relay 28 has four control terminals, shown identified by the symbols "0", "I-1", "I-2" and "C", for interconnecting the relays 28 such that each downstream subsystem 22 may be connected to the upstream subsystems to control the upstream subsystems. For this purpose, the "C" or common terminals are interconnected such that all the ground leads 49 of all the subsystems 22 are connected together to establish a common ground. The output terminal "0" of each downstream subsystem may be connected to the "I-1" or "I-2" terminal of each subsystem upstream thereof. Where the "0" terminal of a downstream subsystem is connected to the "I-1" terminal of an upstream subsystem, the downstream subsystem would provide for "grounding" the "I-1" terminal of the upstream subsystem when the ground fault signal level of the downstream subsystem has reached the detection level and the transistor 130 has therefore been switched to the conductive state. The "I-1" terminal is connected via the lead 114 and a suitable isolation diode to the instantaneous charge section 104 and such that that section is grounded and thereby deactivated with the "I-1" terminal is grounded by the downstream subsystem. With the instantaneous charge section 104 so deactivated, the slow charge section 103 alone would be effective in charging the accumulator 89. Thus, the downstream subsystem 22 would function to switch the upstream subsystem to its delay mode of operation. Also, it can be seen that a trip relay 28 may be continuously set at the delay mode of operation by connecting a suitable jumper 170 between the "C" and "I-1" terminals of the trip relay 28 as shown in broken lines in the drawing (or alternatively, between the "0" and "I-1" terminals).

Similarly, the control terminal "0" of a down-stream subsystem may be connected to the "I-2" terminal of an upstream subsystem 22 to "ground" that terminal when the downstream subsystem is switched by a ground fault current above the detection level. The "I-2" terminal is connected via a lead 162 and a suitable isolation diode to the accumulator capacitor 102 such that when the "I-2" terminal is grounded by a downstream subsystem 22 the capacitor 102 is grounded and therefore cannot be charged to trip the respective circuit breaker 26. The interconnections between subsystems may be varied as desired to provide proper ground fault current protection and at the same time prevent unnecessary tripping of the upstream breakers. For example, as shown in the drawing, in a system employing three subsystems 22, the "I-1" terminal of the intermediate subsystem and the "I-2" terminal of the upstream system may be connected to the control terminal of "0" of the downstream system, and the "0" terminal of the intermediate subsystem may be connected to the "I-1" terminal of the upstream system. Of course, other connections are possible as may be desired.

As will be apparent to persons skilled in the art, various modifications, adaptations and variations of the foregoing specific disclosure can be made without departing from the teachings of the present invention.

We claim:

1. In a ground fault responsive protection system for opening a circuit interrupter of an electrical distribution system upon the occurrence of a ground fault current in the electrical distribution system of a preestablished level and comprising ground fault signal generating means for generating a ground fault signal which varies with the ground fault current, circuit interrupter operating means for opening the circuit interrupter, and control means operable by the ground fault signal for operating the circuit interrupter operating means for opening the circuit interrupter when the ground fault current reaches the pre-established level, the improvement wherein the control means comprises ground fault signal level detection means operable by the ground fault signal for producing a control signal when the ground fault current reaches said pre-established level, first and second independently operable control circuit means connected to be activated by the control signal for operating the circuit interrupter operating means for opening the circuit interrupter, the first and second control circuit means, upon being activated by the control signal being operable for operating the circuit interrupter operating means substantially instantaneously and after a pre-established time delay respectively, and first deactivating means for deactivating the first control circuit means to permit delayed operation of the circuit interrupter operating means by said second control circuit means.

2. A ground fault responsive protection system according to claim 1 wherein the circuit interrupter operating means comprises circuit interrupter switch means operable at a pre-established voltage level for opening the circuit interrupter and capacitor means adapted to be charged to said pre-established voltage level for operating the circuit interrupter switch means, and wherein the first and second control circuit means are first and second capacitor charging means operable when activated by the control signal for respectively charging the capacitor means to said pre-established voltage level substantially instantaneously and at a pre-established rate providing said time delay.

3. A ground fault responsive protection system according to claim 2 wherein the second capacitor charging means is adjustable for setting the pre-established rate and for thereby setting said time delay.

4. A ground fault responsive protection system according to claim 2 wherein the first deactivating means comprises means for diverting the charge of the first capacitor charging means from the capacitor means.

5. A ground fault responsive protection system according to claim 2 further comprising second deactivating means connected to the capacitor means for bleeding off the charge therefrom for preventing operation of the circuit interrupter switch means.

6. A ground fault responsive protection system according to claim 2 wherein the control means comprises a control switch connected to the capacitor means for being switched from a conductive state for discharging the capacitor means and a non-conductive state for permitting the capacitor means to be charged by the first and second capacitor charging means, the control switch being switched to its non-conductive state by the control signal while the ground fault current is at said pre-established level, and means interconnecting the control switch and capacitor means for discharging the capacitor means at a pre-established gradual rate when the control switch is in its conductive state.

7. In a ground fault responsive protection system for opening a circuit interrupter of an electrical distribution system upon the occurrence of a ground fault current in the electrical distribution system of a pre-established level and comprising ground fault signal generating means for generating a ground fault signal which varies with the ground fault current, circuit interrupter operating means operable for opening the circuit interrupter, and control means operable by the ground fault signal for operating the circuit interrupter operating means for opening the circuit interrupter when the ground fault current reaches the pre-established level, the improvement wherein the control means comprises ground fault signal level detection means connected to be operated by the ground fault signal for producing a control signal when the ground fault current reaches said pre-established level, wherein the circuit interrupter operating means comprises circuit interrupter switch means operable at a pre-established voltage level for opening the circuit interrupter and capacitor means adapted to be charged to said pre-established voltage level for operating the switch means for opening the circuit interrupter, and wherein the control means further comprises one-way conducting means connected for conducting current to the capacitor means for charging the capacitor means and charge means connected for charging the capacitor means via the one-way conducting means at a first pre-established rate to said pre-established voltage level, resistor means connected to the capacitor means in parallel with the oneway conducting means for discharging the capacitor means and a control switch connected to the resistor means for being switched from a conductive state for discharging the capacitor means via the resistor means at a second pre-established relative gradual rate and a non-conductive state for permitting the capacitor means to be charged via the one-way conducting means at said first rate by the charge means, the control switch being operable by the control signal while the ground fault current is at said pre-established level for switching the control switch to its non-conductive state.

8. In a multi-zone ground fault responsive protection system for selectively operating a plurality of circuit interrupters of a plurality of upstream and downstream related distribution zones respectively of an electrical distribution system upon the occurrence of preestablished ground fault current levels in the respective distribution zones of the electrical distribution system and having a plurality of ground fault responsive subsystems for the plurality of distribution zone circuit interrupters respectively, each comprising ground fault signal generating means for generating a ground fault signal which varies with the ground fault current in the respective distribution zone, circuit interrupter operating means for operating the respective circuit interrupter, and control means operable by the respective ground fault signal for operating the respective circuit interrupter operating means when the respective ground fault current reaches the preestablished level, the improvement wherein the subsystem control means comprises ground fault signal level detection means operable by the respective ground fault signal for producing a control signal while the respective ground fault current is at the pre-established level, first and second control circuit means connected to be activated with the control signal for independently operating the circuit interrupter operating means, the first and second control circuit means while activated being operable for operating the circuit interrupter operating means substantially instantaneously and after a pre-established time delay respectively, and interlock means interconnecting the subsystems to deactivate the first control circuit means of an upstream system with the control signal of a downstream subsystem.

9. A multi-zone ground fault responsive protection system according to claim 8 wherein the circuit interrupter operating means comprises circuit interrupter switch means operable at a pre-established voltage level for operating the circuit interrupter, and capacitor means adapted to be charged to said pre-established voltage level for operating the circuit interrupter switch means; wherein the first and second control circuit means are first and second capacitor charging means connected to be activated with the respective subsystem control signal for respectively charging the capacitor means to said pre-established voltage level substantially instantaneously and at a preestablished rate providing said time delay; and wherein the interlock means comprises means activated with the control signal of said downstream subsystem for diverting the charge of the first capacitor charging means of the upstream system from the respective capacitor means.

10. A multi-zone ground fault responsive protection system according to claim 9 wherein the subsystem ground fault signal level detection means comprises a control switch adapted to be switched from a non-conductive state to a conductive state to generate the control signal, and wherein the interlock means comprises means connecting the control switch of the downstream subsystem for diverting the charge of the first capacitor charging means from the respective capacitor means of the upstream subsystem while said control switch is in its conductive state.

11. In a ground fault responsive protection system for opening a circuit interrupter of an electrical distribution system upon the occurrence of a ground fault current in the electrical distribution system of a preestablished level and comprising ground fault signal generating means having a pair of output leads for generating a ground fault signal having a signal level potential between the output leads which increases with the ground fault current, circuit interrupter operating means for opening the circuit interrupter, ground fault signal level detection means operable by the ground fault signal for producing a control signal when the ground fault current reaches said pre-established level, and control means operable by the control signal for operating the circuit interrupter operating means for opening the circuit interrupter, the improvement wherein the ground fault signal level detection means comprises a transistor switch with base and emitter control leads adapted to be switched between conductive and non-conductive states and to be switched from one of said states to the other state to produce said control signal upon the application of a generally pre-established potential difference between the base and emitter control leads, one of the transistor switch control leads being connected to one of the output leads of the signal generating means whereby said one output lead establishes a reference voltage potential, a substantially linear potentiometer and means connecting the potentiometer between the other output lead of the signal generating means and to the other control lead of the transistor switch so that the potential across the potentiometer is equal to the signal level potential when the pre-established potential difference across the transistor is established by the signal level potential to switch the transistor from said one state to said other state to produce said control signal.

* * * * *